United States Patent [19]

Vermette

[11] Patent Number: 4,795,351

[45] Date of Patent: Jan. 3, 1989

[54] DEVICE AND METHOD FOR REHABILITATION AND EVALUATION

[75] Inventor: John E. Vermette, Baltimore, Md.

[73] Assignee: Baltimore Therapeutic Equipment Co., Hanover, Md.

[21] Appl. No.: 113,657

[22] Filed: Oct. 28, 1987

[51] Int. Cl.[4] .............................................. G09B 19/00
[52] U.S. Cl. .................................................... 434/258
[58] Field of Search ................................ 434/258, 259

[56] References Cited

U.S. PATENT DOCUMENTS

| 2,623,303 | 12/1952 | Mindel | 434/259 |
| 2,880,001 | 3/1959 | Rosenzweig | 273/136 |
| 2,985,451 | 5/1961 | Sims | 434/260 X |
| 3,235,263 | 2/1966 | Smith | 273/1 G |
| 3,427,731 | 2/1969 | Debolt | 434/260 |
| 3,479,751 | 11/1969 | Welbourn | 434/259 |
| 3,484,105 | 12/1969 | Winston | 273/1 G |
| 4,457,722 | 7/1984 | Housand | 434/260 |
| 4,692,119 | 9/1987 | Ussery | 434/259 |

OTHER PUBLICATIONS

Advertisement and Product Description of Velpar International Corporation of Tuscon, Ariz., Sep., 1986.

Primary Examiner—William H. Grieb
Attorney, Agent, or Firm—James J. Brown

[57] ABSTRACT

A method and device for rehabilitation and evaluation are described in which the individual is required to perform manual operations within a visually obscured enclosure. Partitions are provided within the enclosure to simulate the performance of mechanical operations within a confined space. The operations themselves may typically be the placing and tightening of nuts on bolts which project into the enclosure.

13 Claims, 2 Drawing Sheets

DEVICE AND METHOD FOR REHABILITATION AND EVALUATION

SUMMARY OF THE INVENTION

The present invention is directed to a device for the evaluation and rehabilitation of individuals. More particularly, the present invention is directed to a device for rehabilitative therapy and evaluation which simulates mechanical assembly operations in which the individual is required to work in confined areas which are visually obscured.

BACKGROUND OF THE INVENTION

Because of the complex and intricate manipulations which the human hand performs particularly in mechanical assembly operations, the evaluation and rehabilitative therapy of the human hand is especially difficult. For example, the repair or assembly of mechanical devices such as automotive engines and associated structures frequently requires the individual to assemble or disassemble complex mechanical parts in confined areas in which the parts being assembled or disassembled are either partially or totally obscured. Individuals who have suffered injury or loss of function therefore have a difficult program of rehabilitation even after the injury has otherwise been remedied. The acquisition of the fine motor and sensory manipulations required for example, to place a nut on a bolt in a confined area where the individual cannot see what he or she is doing can require painstaking and arduous effort.

Accordingly, it is an object of the present invention to provide a regimen and device for rehabilitative therapy and evaluation which permits the individual to practice the assembly and disassembly of nuts and bolts within a confined, closed space. It is a further object of the present invention to provide a device for such therapy and evaluation in which the individual cannot actually see the assembly or disassembly procedure which is being practiced. Yet a further object of the present invention is to provide a device for rehabilitative therapy and evaluation in which the individual practices such therapy using only one hand in an environment in which the work cannot be seen. The attainment of these and other objects will however, be more readily apparent from the description of the present invention which follows.

DETAILED DESCRIPTION OF THE INVENTION

According to the present invention, a device and method are provided for rehabilitative therapy and evaluation which comprises an enclosed structure having a visually obscured interior with one or more apertures in the exterior walls to permit insertion of the human hand. The interior of the structure is provided with one or more devices for performing or simulating manual operations within the enclosed structure. Typically, these devices are bolts projecting into the interior of the structure and adapted to receive nuts. While the bottom of the structure can be left open to facilitate access, the top is closed so that the individual using the device cannot see the actual operation which he is performing with the hand inserted into the structure. The interior of the structure is provided with one or more removable partitions which themselves are provided with apertures to permit insertion of the human hand into the various chambers which are thereby created.

Figure 1:
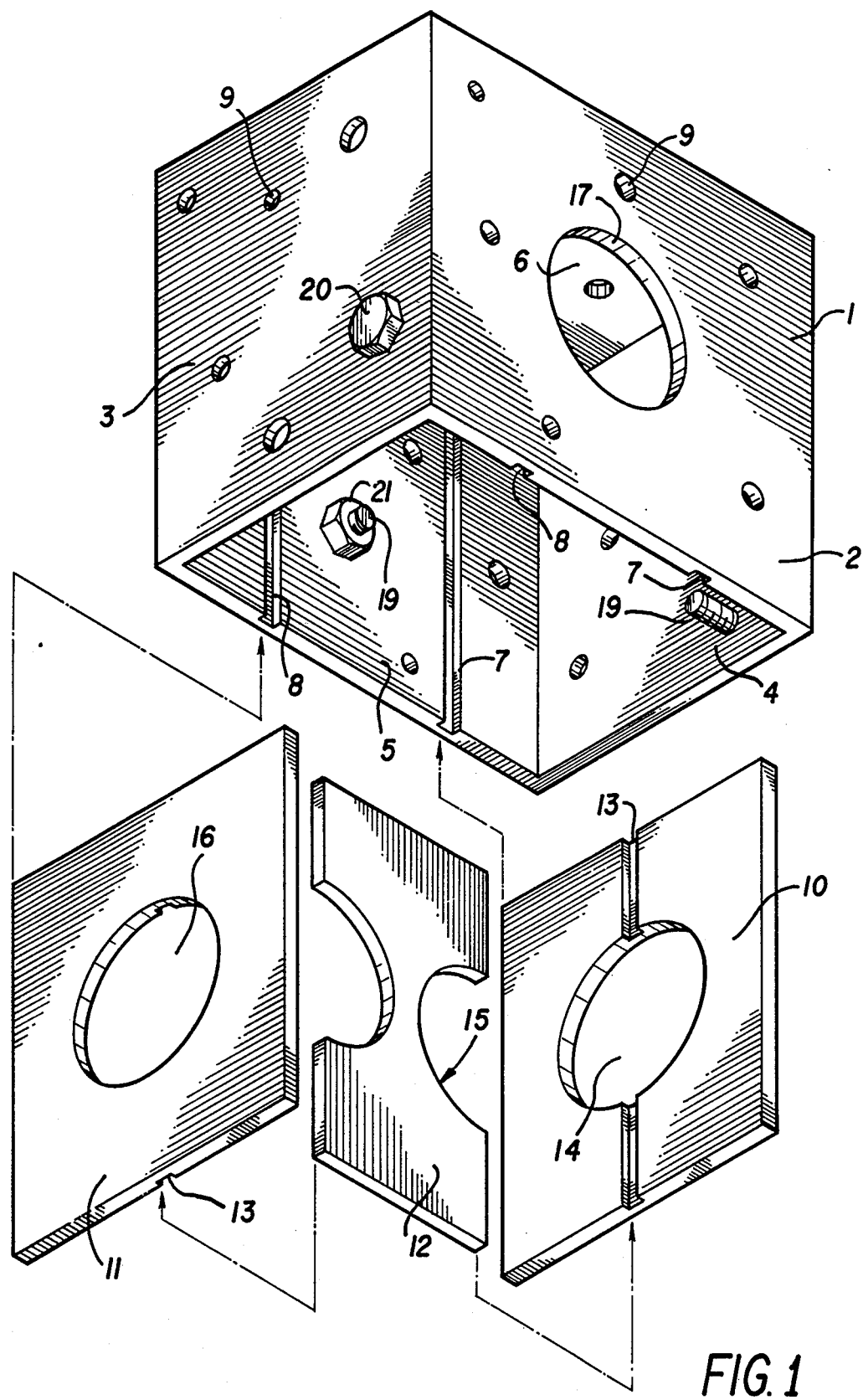
FIG. 1 is an exploded perspective view of the device of the present invention with the interior partitions withdrawn.

The invention will however, be more fully appreciated by having reference to the drawings which describe a preferred embodiment and best mode of the invention. Directing attention to FIG. 1 of the drawings, a generally rectangular, box-like structure 1, is shown having vertical side walls 2, 3, 4 and 5 and a top 6. A round hole or aperture 17, is provided in the side wall 1, although it will of course, be understood that this aperture could be provided in any of the other side walls or the top and additional similar holes for access into the interior of the unit can also be provided. The interior surface of side walls 2 and 5 define pairs of grooves 7 and 8 to accommodate respectively vertical partitions 10 and 11. These vertical partitions are provided with round holes or apertures 14 and 16 as well as vertical slots 13. An additional vertical partition 12 is provided with semi-circular holes 15. A substantial number of smaller holes or apertures 9 are variously provided in the side walls 2, 3, 4 and 5 of the structure, as well as the top 6. These holes are to accommodate bolts or similar devices which project into the interior of the structure as shown at 19. The head of these bolts is shown in FIG. 1 on the exterior wall 3 at 20. These bolts have threads to accommodate nuts 21.

Figure 2:
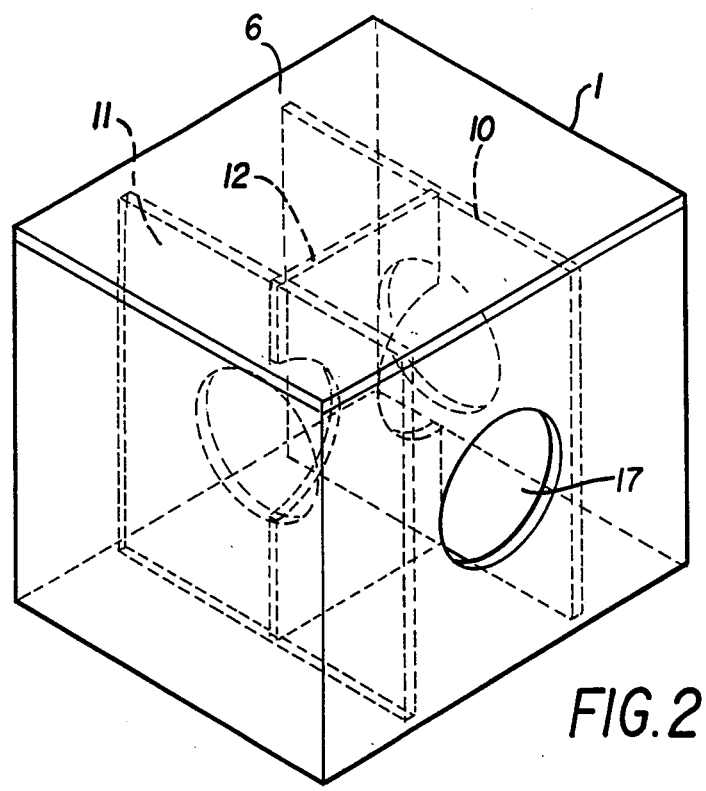
FIG. 2 is a perspective view of the structure of the present invention showing the interior partitions in phantom within the structure.

In actual use, the device of the invention is assembled as shown in phantom in FIG. 2 of the drawings with the partitions 10, 11, and 12 inserted into the respective slots so that the interior of the box-like structure is partitioned. The individual using the device of the present invention is required to insert his hand through the hole or aperture 17 into the interior of the structure and possibly also through one or more of the holes 14, 15 and 16 in the interior partitions 10, 11 and 12 to perform the manual operation of placing a nut 21 onto one of the bolts which project into the interior, of the structure. This must be done without being able to actually see the operation.

Figure 3:
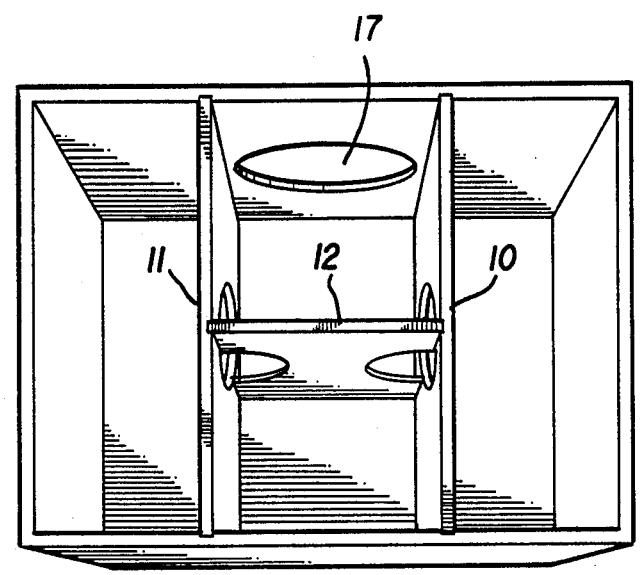
FIG. 3 is a bottom view of the invention.

FIG. 3 of the drawings shows the assembled enclosure of the invention from the bottom with the partitions heretofore described in place.

It will of course be understood that the device of the present invention can take additional forms than illustrated in the drawings in order to vary the nature and difficulty of the required operation. For example, the partitions can actually be removed or replaced by other or different partitions and various arrangements of apertures can be provided to alter access into the interior chambers of the device. Additionally, the bolts which project into the interior can themselves be altered or replaced by other devices requiring manual manipulation. For example, the bolts can be spring loaded to increase the difficulty of placing a nut or other unit on the bolt, or an entirely different type of device can be provided. Holes such as those shown at 9 can also be provided in the partitions themselves to simulate manual operations at different angles and in different manner. The essential concept of the invention however, is to simulate manual operations within an enclosed and partitioned visually obscured structure to facilitate manual rehabilitative therapy and evaluation.

I claim:

1. A device for rehabilitative therapy and devaluation which comprises an enclosed structure having a visually obscured interior with at least one aperture in the exterior walls thereof to permit insertion of a human hand, said interior being provided with partition means and means for performing or simulating the mating of bolts and nuts and the insertion of bolts into holes provided in said device.

2. The device of claim 1 wherein said partition means comprises a plurality of removable partitions.

3. The device of claim 1 wherein said enclosed structure is a box.

4. The device of claim 1 wherein the exterior walls of said enclosed structure are provided with means for accommodating said means for performing or simulating the mating of bolts and nuts within said structure.

5. The device of claim 4 wherein said accommodating means are holes for accommodating bolts which project into said interior.

6. A device for rehabilitative therapy and evaluation which comprises an enclosed structure having a visually obscured interior with at least one aperture in the exterior walls thereof to permit insertion of a human hand, said interior being provided with a plurality of removable partition means having apertures to permit passing a human hand there-through and means for performing or simulating manual operations within said enclosured structure.

7. The device of claim 6 wherein the exterior walls of said enclosed structure are provided with means for accommodating said means for performing or simulating manual operations within said structure.

8. The device of claim 7 wherein said accommodating means are holes for accommodating bolts which project into said interior.

9. The device of claim 6 wherein said enclosed structure is a box.

10. A device for manual rehabilitative therapy and evaluation which comprises an enclosed walled structure having a visually obscured interior and exterior walls with one or more apertures to permit insertion of the human hand into said interior, at least one partition mounted in the enclosed area of said walled structure, said at least one partition being provided with aperture means to permit passage of the human hand, said exterior walls being provided with a plurality of smaller holes to accommodate fastener means which project into said interior to receive nuts which are to be placed thereon by the hand being inserted into the interior of said structure.

11. The device of claim 10 wherein said structure is rectangular and is provided with exterior side walls and a top and is open at the bottom.

12. The device of claim 10 wherein said structure is a box.

13. A method of rehabilitative therapy and evaluation which comprises inserting at least one hand into a visually obscured enclosure having a partition means in the interior thereof and passing and tightening nuts and bolts which project into the interior of said visually obscured enclosure with the fingers of said inserted hand without being able to see said operation.

* * * * *